(12) United States Patent
Eldada et al.

(10) Patent No.: US 7,167,647 B2
(45) Date of Patent: Jan. 23, 2007

(54) WAVELENGTH DIVISION MULTIPLEXING OPTICAL PERFORMANCE MONITORS

(75) Inventors: Louay Eldada, Lexington, MA (US); Reinald Gerhardt, Andover, MA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 546 days.

(21) Appl. No.: 10/315,682

(22) Filed: Dec. 10, 2002

(65) Prior Publication Data

US 2003/0152385 A1    Aug. 14, 2003

Related U.S. Application Data

(60) Provisional application No. 60/338,952, filed on Dec. 10, 2001.

(51) Int. Cl.
*H04B 10/08* (2006.01)
*H04B 10/12* (2006.01)
*H04J 14/02* (2006.01)

(52) U.S. Cl. .............. 398/33; 398/87; 398/149

(58) Field of Classification Search .......... 398/33, 398/87, 177, 149; 356/73.1, 450, 477, 491; 385/11, 14, 37
See application file for complete search history.

(56) References Cited

U.S. PATENT DOCUMENTS

| | | | |
|---|---|---|---|
| 5,974,206 A * | 10/1999 | Bricheno et al. ............ 385/11 |
| 6,097,487 A * | 8/2000 | Kringlebotn et al. ....... 356/450 |
| 6,262,822 B1 * | 7/2001 | Obhi et al. ................... 398/9 |
| 6,271,952 B1 * | 8/2001 | Epworth ..................... 398/147 |
| 6,275,623 B1 | 8/2001 | Brophy et al. |
| 6,310,703 B1 | 10/2001 | Alavie et al. |
| 6,341,039 B1 | 1/2002 | Flanders et al. |
| 6,344,910 B1 | 2/2002 | Cao |
| 6,373,632 B1 | 4/2002 | Flanders |
| 6,396,051 B1 | 5/2002 | Li et al. |
| 6,407,376 B1 | 6/2002 | Korn et al. |
| 6,433,901 B1 | 8/2002 | Cao |
| 6,606,158 B1 * | 8/2003 | Rosenfeldt et al. .......... 356/477 |
| 2003/0016425 A1 * | 1/2003 | Tan et al. .................... 359/192 |
| 2004/0247227 A1 * | 12/2004 | Eder et al. ................... 385/11 |

FOREIGN PATENT DOCUMENTS

| | | |
|---|---|---|
| DE | 19918630 | 11/2000 |
| EP | 1011213 | 6/2000 |
| WO | WO 01/67658 | 9/2001 |

OTHER PUBLICATIONS

International Search Report for PCT/US02/39587, dated Feb. 6, 2004.

* cited by examiner

*Primary Examiner*—Dalzid Singh

(57) ABSTRACT

The present invention is generally directed to optical signal devices that monitor the quality of an optical signal in a wavelength division multiplexing system by evaluating the information in the different wavelength channels.

1 Claim, 5 Drawing Sheets

WAVELENGTH DIVISION MULTIPLEXING OPTICAL PERFORMANCE MONITORS

FIELD OF THE INVENTION

The present invention is generally directed to optical signal devices that monitor the quality of an optical signal in a wavelength division multiplexing system by evaluating the information in the different wavelength channels (e.g., optical power per wavelength channel, optical signal-to-noise ratio, center wavelength of channels).

TECHNICAL BACKGROUND

Optical carriers place optical monitors at different points in their networks in order to ensure the quality of the optical signals. The larger the number of monitor points in the network, the easier it is for said carriers to locate the source of a problem, and the sooner they can correct it. The information collected by the optical monitors needs to have a high level of accuracy in order to be useful. One effect that can limit the accuracy and usefulness of the monitor is polarization dependence. For example, an optical notch filter based on a tunable Bragg grating might have a birefringence level (difference between the refractive indices of the two polarization eigenmodes (the two independent polarization states, the linear combination of which forms all other polarization states)) that is unacceptably high, causing the filter to drop (at a particular tuning setting) different wavelengths depending on the polarization, or a combination of two wavelengths (if the optical signal is a combination of the two polarization eigenmodes). This polarization splitting is undesirable since it reduces the accuracy of the monitor, and in extreme cases makes the monitor useless.

An optical performance monitor typically has at its core a tunable filter. When a filter is tuned by some actuation mechanism (heat, pressure, electric field, magnetic field, etc.), some of its properties typically change (besides dropping different wavelengths). The changing properties can include some detrimental effects, which effects can become more or less severe as the filter is tuned to different points in the wavelength band of interest.

Various types of optical performance monitors are known in the art. U.S. Pat. No. 6,433,901, describes an "Optical performance monitor". U.S. Pat. No. 6,407,376 describes an "Optical channel monitoring system with self-calibration" where optical performance monitoring and calibration are performed simultaneously. U.S. Pat. No. 6,396,051 describes a "High resolution optical performance monitor for a DWDM system". Optical performance monitoring is performed using a notch filter that is a Bragg grating formed in a glass fiber. U.S. Pat. No. 6,373,632 describes a "Tunable Fabry-Perot filter". U.S. Pat. No. 6,344,910 describes an "Optical performance monitor" wherein monitoring is performed using a demultiplexer and a switch. U.S. Pat. No. 6,341,039 describes a "Flexible membrane for tunable Fabry-Perot filter". Optical performance monitoring is performed using a tunable Fabry-Perot filter. U.S. Pat. No. 6,310,703 describes a "Method and apparatus for optical performance monitoring in wavelength division multiplexed fiber optical systems". Optical performance monitoring is performed by splitting the optical signal in two parts and sending one part through an optical filter with continuously increasing or decreasing transmission as a function of wavelength, keeping the other part unperturbed, and using the ratio of the two parts for calibration, while obtaining a power reading from the unperturbed part of the signal. U.S. Pat. No. 6,407,376, "Optical channel monitoring system with self-calibration" Optical performance monitoring and calibration are performed simultaneously.

All of the above art involve bulk optical elements, not integrated optical elements (optical circuits on a chip), and do not address the issue of polarization dependent behavior of the optical filter.

GLOSSARY

By "tunable filter" herein means a device that scans across a wavelength band of interest to detect signals and routes these detected signals to an optical power detector.

An "optical power detector" herein is a device for detecting signals (e.g. a photodiode). An "actuation mechanism" herein means a means for causing a change of tuning in a filter actuation mechanism device and includes heat, pressure, electric field, magnetic field and like mechanisms.

The "birefringence level" if the difference between the refractive index of two polarization eigenmodes, A "coupler" herein is a waveguide composed of two or more fibers placed in close proximity of one another, the proximity being such that the mode fields of the adjacent waveguides overlap to some degree.

By "polarizational eigenmode" is meant an independent polarization state. The linear combination of each independent eigenmode forms all other polarization states. The separation of eigenmodes allows for the measurement of the "polarization mode dispersion (PMD)."

By "optical monitor(s)" is meant a device or devices that may be installed at different points in an optical network in order to ensure the quality of optical signals. The information monitored includes optical power per wavelength channel, optical signal to noise ratio (OSNR), center wavelength of channel and the polarization mode dispersion.

A "wavelength division multiplexing system is referred to as "WDM" herein.

SUMMARY OF THE INVENTION

The present invention avoids the aberations in properties caused by the tuning mechanisms by processing the two polarization eigenmodes separately. The filter of each polarization eigenmode can be tuned at a different rate to accommodate the change in the polarization splitting that is caused by a change in the level of birefringence with the tuning. The present invention is generally directed to optical signal devices that monitor the quality of an optical signal in a wavelength division multiplexing system by evaluating the information in the different wavelength channels (e.g., optical power per wavelength channel, optical signal-to-noise ratio, center wavelength of channels). The device embodiments include tunable filters that scan across the wavelength band of interest and drop narrow signals as they are tuning, where said dropped signals are routed to optical power detectors (e.g., photodiodes). In the event that the filters treat the two polarization eigenmodes differently, some embodiments of the present device correct for this aberration by sending the two polarization eigenmodes down two separate paths and processing each mode separately. The separation of the two polarization eigenmodes also allows for measurement of the polarization mode dispersion.

More specifically, the invention concerns wavelength division multiplexing (WDM) optical performance monitor apparatus, based on a tunable filter, and exhibiting behavior that is essentially polarization independent, where polarization independence is achieved through the use of a device selected from the group consisting of: (a) a polarization mode splitter; (b) a power splitter or switch, and polarizers. The apparatus of may include an embodiment where the tunable filter is based on a Bragg grating. In one embodiment the monitor exhibits a wavelength accuracy that is essentially absolute through the use of an absolute wavelength reference. A dedicated light source may be used in conjunction with the absolute wavelength reference. The absolute wavelength reference may include a reflective filter. In one embodiment a reflective filter is a fiber Bragg grating. The grating may be athermal. The reference may include an absolute wavelength reference including a transmissive filter. The transmissive filter may be an etalon, which can be athermal.

The apparatus described above can measure at least one of the following characteristics of the incoming optical signal to be monitored: optical power per wavelength channel, optical signal-to-noise ratio (OSNR), center wavelength of channels and polarization mode dispersion (PMD).

DETAILED DESCRIPTION OF THE INVENTION

Figure 1:
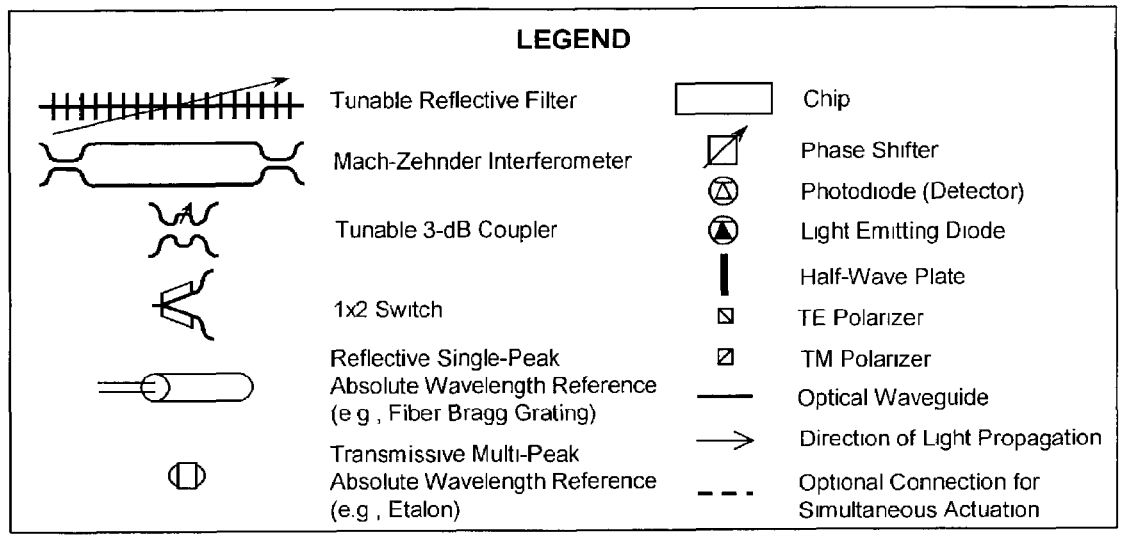
FIG. 1 describes an optical monitor with a polarization splitter at the input, having two tunable reflective filters.
2.
Figure 1:
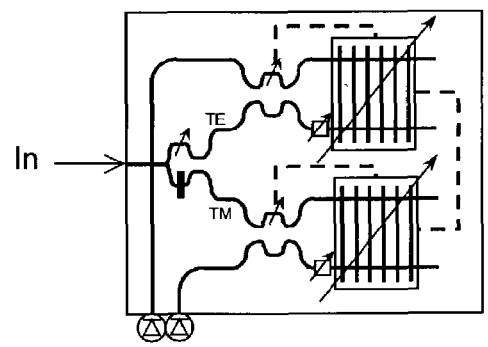

The present invention is generally directed to optical signal devices that monitor the quality of an optical signal in a wavelength division multiplexing (WDM) system by evaluating the information in the different wavelength channels. The information monitored by the device can include but is not limited to:

Optical power per wavelength channel
Optical Signal-to-Noise Ratio (OSNR)
Center wavelength of channels
Polarization mode dispersion (PMD)

The devices include tunable notch filters that scan across the wavelength band of interest and drop narrow signals as they are tuning, and said signals are routed to optical power detectors (e.g., photodiode). In the case where a single filter does not tune over the entire band of interest, the filter can be replaced with a circuit that includes multiple individual filters that cover different sections of said band.

In the event that the filters treat differently the two polarization eigenmodes, some embodiments of the present invention correct for this aberration by sending the two polarization eigenmodes down two separate paths and processing each mode separately. The polarization separation can occur either at the input end, where a polarization splitter can be used and each polarization is sent to a separate tunable filter (when tunable filters are used, as opposed to say, switches and fixed filters), or on the output end when a single tunable filter handles both polarizations and its output is sent to two polarization-specific detectors (where each can be a combination of a polarizer and a photodiode). The separation of the polarization modes also allows to measure the PMD.

DETAILED EXPLANATION OF THE FIGURES

FIG. 1:

The input signal into the chip is a fraction of the signal to be monitored (said input signal having been typically tapped off the main signal and having typically a hundredth to a tenth of the optical power of the main signal). Said input signal enters the chip and traverses a polarization splitter. The polarization splitter can consist of a 1×2 splitter, the two arms of the 1×2 are separated enough to avoid evanescent coupling between them, one of the 2 arms has a half-wave plate, the other has a phase shifter (e.g., a heater), then the two arms come together in an evanescent region, then they separate again, with one of the two polarization eigenmodes (say TE—transverse electric) in one arm and the other eigenmode (say TM—transverse magnetic) in the other arm. Each of the two different polarization signals is routed to a tunable notch filter. The tunable filter can be half a Mach-Zehnder interferometer (MZI) with a grating, where light enters a 3 dB coupler (which can be an evanescent coupler or an MMI coupler or a small MZI coupler, and can be tunable for 50/50 balance, where the tuning can be done thermally) then its power is split 50/50 into two arms that have Bragg gratings (narrow band reflective filters) across them, which gratings are tunable (say thermally with a patterned heater). One narrow wavelength band gets reflected from each MZI, exits an output arm (possibly with the help of a phase shifter (that can be thermal) that ensures the proper phase relationship between the MZI arms), and gets routed to a detector (say a photodiode). Each grating can be at a different set point (say temperature) and each grating can be tuned at a different rate if the two polarization eigenmodes do not tune at the same rate. Also the tuning of the coupler of the MZI can be linked by the control circuitry to the tuning of the grating of that same MZI, so that the 50/50 coupling happens at the wavelength to which the grating is tuned, because typically couplers are wavelength dependent.

Furthermore, the use of high-speed detectors allows to measure the PMD by measuring the delay between the two polarization eigenmodes.

FIG. 2:

Similar to FIG. 1, except that each tunable filter is replaced by two tunable filters in case a single filter cannot cover the entire wavelength band of interest. Selecting one filter or another in a filter pair can be done by using a 1×2 switch. The same concept can be scaled to any number N of filters with a 1×N switch.

Figure 2:
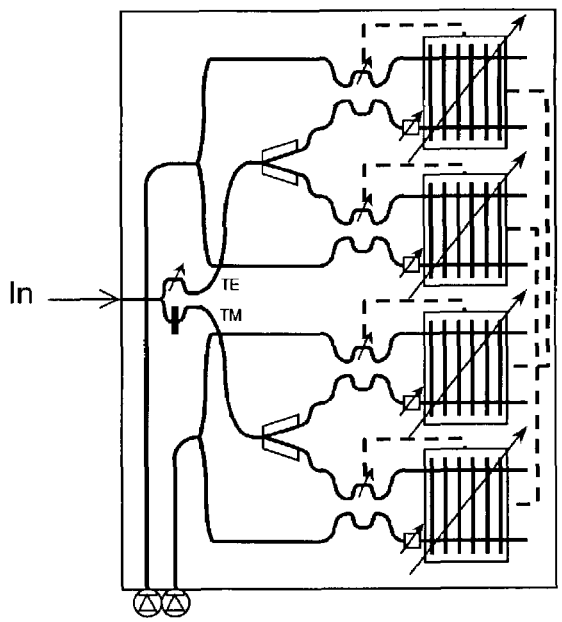
FIG. 2 describes an optical monitor with a polarization splitter at the input, having multiple tunable reflective filters.
3.
Figure 17:
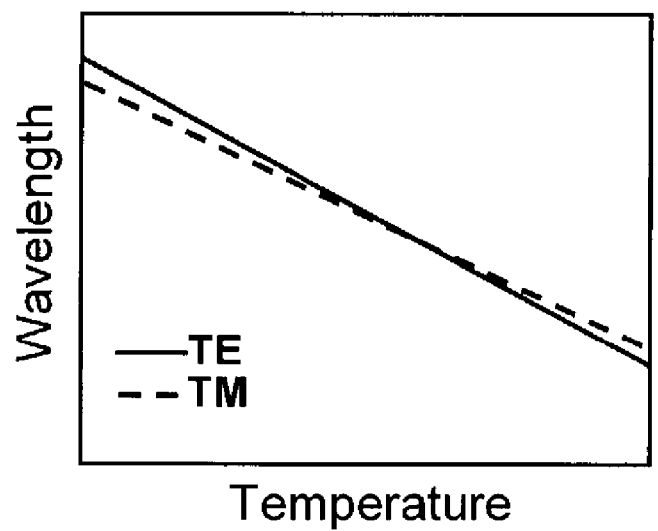
FIG. 17 describes non-identical tuning curves for wavelength versus temperature for a thermally tunable notch filter.

FIG. 3:

Similar to FIG. 2, except the polarization splitting occurs at the output of the chip instead of the input. The entire input signal (that includes all polarizations) enters an MZI that covers the wavelength range of interest, then the reflected signal gets split into 2 essentially equal power signals (through the use of a 3 dB or 50/50 power splitter), and they impinge on detectors through cross-polarized polarizers (e.g., one detector has a TE-oriented polarizer, and the other detector has a TM-oriented polarizer). By collecting two optical power spectra corresponding to the two polarizations, the polarization dependence of the filter is eliminated, as the two spectra are recombined with proper shifts according to calibration tables. FIG. 17 clarifies this point by showing TE and TM tuning curves (wavelength vs. temperature) for a thermally tunable filter; the present design gives two power vs. temperature curves separately (collected at the detectors), then the two curves can be combined by software to produce the desired power vs. wavelength spectrum; at each wavelength, the two power values PTE and PTM measured at the temperatures $T_{TE}$ and $T_{TM}$ that correspond to that wavelength are added.

Furthermore, polarizers at the output and detectors that collect reflections from the same filter, allow more accurate PMD measurements than the use of polarization mode splitters and separate filters, since in the latter case (as in FIGS. 1 & 2) the two filters might not be synchronized.

Figure 3:
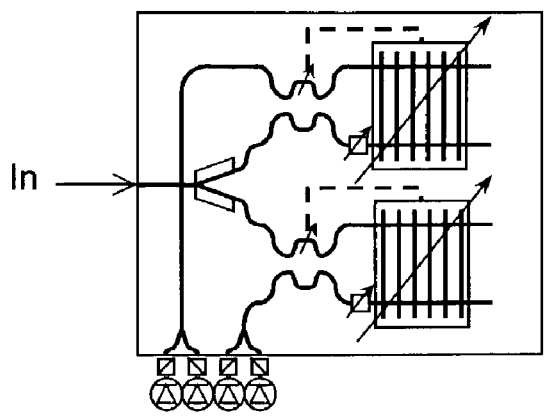
FIG. 3 describes an optical monitor where polarization split occurs at the output.
4.

FIG. 4:

Similar to FIG. 3, except the power splitter at the output is replaced with a 1×2 switch, allowing more power to reach the detector, therefore improving the dynamic range of the component. Operation of this device requires toggling the 1×2 switch in order to alternately collect data at both polarization states.

FIG. 5:

Similar to FIG. 3, except the outputs from the 2 MZI's are combined with a 1×2 power combiner, permitting the use of a single pair of polarizers/detectors.

Figure 4:
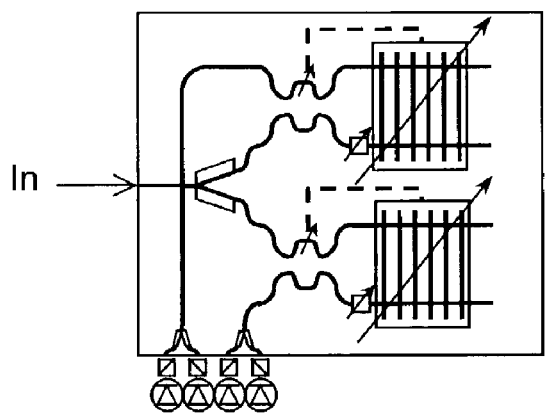
FIG. 4 describes an optical monitor where polarization split occurs at the output via a 1×2 switch.
5.

FIG. 6:

Similar to FIG. 4, except the outputs from the 2 MZI's are combined with a 1×2 switch, permitting the use of a single pair of polarizers/detectors. The additional 1×2 switch is thrown in a single state that corresponds to the MZI being used.

Figure 5:
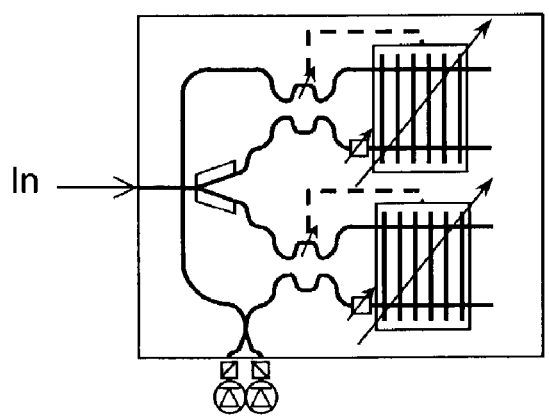
FIG. 5 describes an optical monitor where polarization split occurs at the output and where outputs from two MXI's are combines with a 1×2 power combiner, permitting the use of a single pair of polarizers or detectors.
6.
Figure 6:
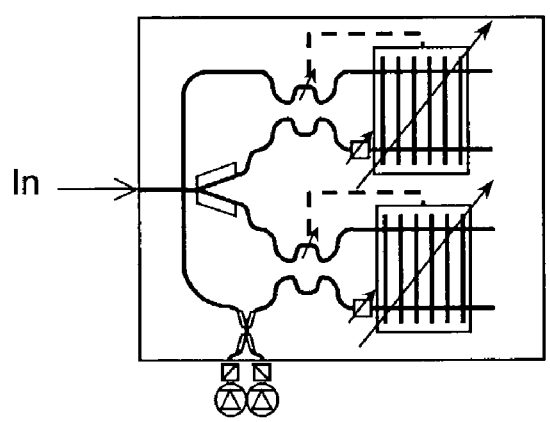
FIG. 6 describes an optical monitor where polarization split occurs at the output via a 1×2 switch where the outputs from two MXI's are combined with a 1×2 power combiner, permitting the use of a single pair of polarizers or detectors.
7.

FIG. 7:

Similar to FIG. 5, but incorporating an absolute wavelength reference based on a reflective notch filter (e.g., fiber Bragg grating) that is either athermal or thermal, with the thermal filter either being held at essentially constant temperature or being used with a temperature sensor (however its refractive index is typically stable with environment and time). In this configuration, the reference takes its input from a combination of the outputs of the two MZI's.

Figure 7:
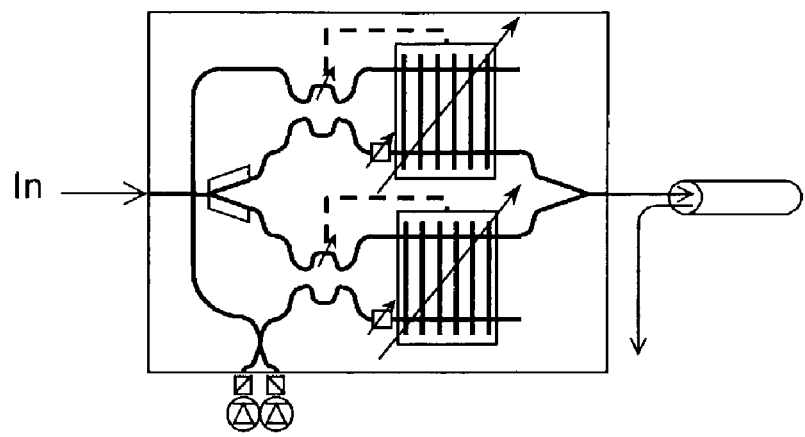
FIG. 7 describes an optical monitor where polarization split occurs at the output and where outputs from two MXI's are combines with a 1×2 power combiner, permitting the use of a single pair of polarizers or detectors
8.

FIG. 8:

Similar to FIG. 7, except the reflective wavelength reference takes its input from a tap between the combiner and the splitter at the output.

FIG. 9:

Similar to FIG. 7, except with a single MZI that covers the entire spectral range of interest.

Figure 8:
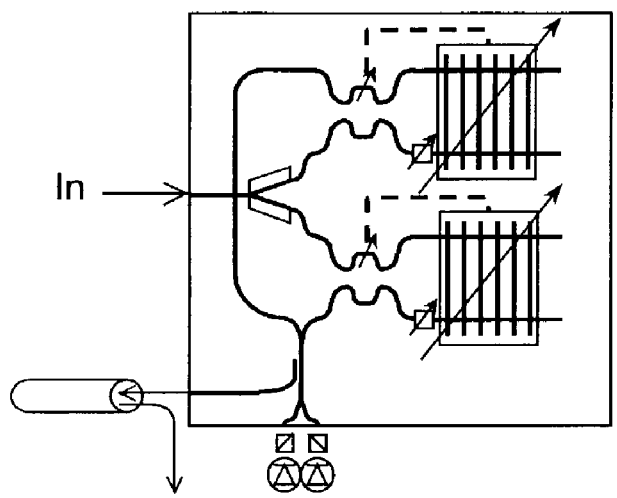
FIG. 8 describes an optical monitor as in FIG. 7 where the reflective wavelength takes its input from a tap between the combiner and the splitter at the output.
9.
Figure 9:
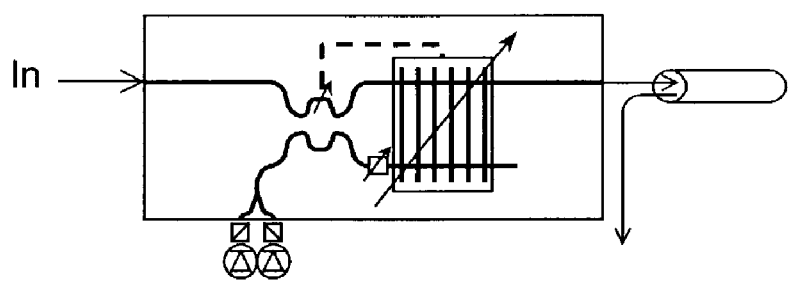
FIG. 9 describes an optical monitor as in FIG. 7 where a single MZI covers the entire spectral range.
10.

FIG. 10:

Similar to FIG. 8, except with a single MZI that covers the entire spectral range of interest.

Figure 10:
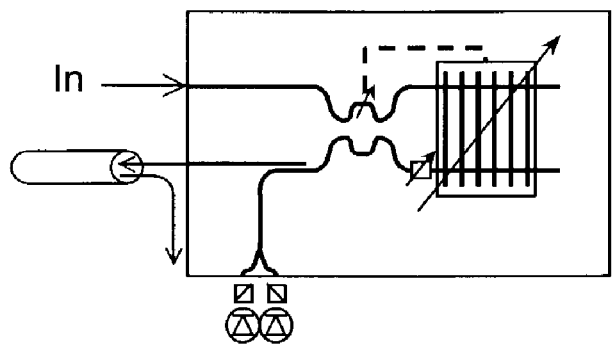
FIG. 10 describes an optical monitor as in FIG. 8 where a single MZI covers the entire spectral range.
11.

FIG. 11:

Similar to FIG. 10, except the absolute reflective wavelength reference takes its input from a dedicated light source (e.g., light emitting diode (LED)), since the reference reflects at a single wavelength and there is no guarantee that the incoming optical signal to be monitored has a signal at that wavelength. In this case the output of the reference is combined with the incoming optical signal to be monitored. The 1×2 combiner can be replaced with a 1×2 switch.

Figure 11:
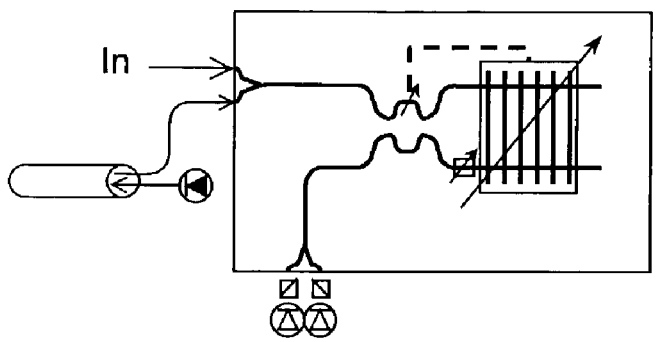
FIG. 11 describes a monitor similar to FIG. 10 where the output of a reference signal is combined with an incoming signal to be monitored.
12.
Figure 12:
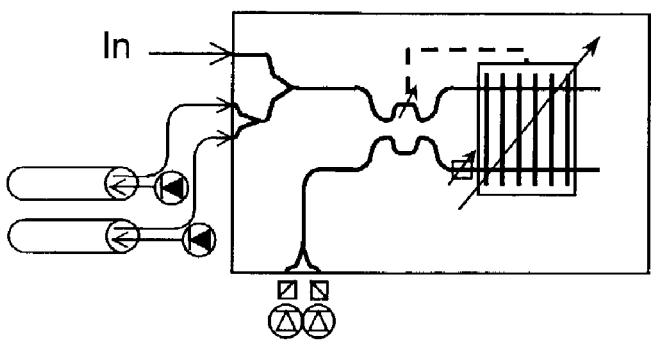
FIG. 12 describes a monitor similar to FIG. 11 but where two references are used.
13.

FIG. 12:

Similar to FIG. 11, except two references are used (typically one at each end of the tuning wavelength range) to provide two points on the calibration curve for higher accuracy.

FIG. 13:

Similar to FIG. 11, except with two MZI's that cover two segments of the wavelength tuning range. The output of the reference and the incoming optical signal to be monitored enter a 2×2 (cross-bar) switch. In this configuration, one MZI can be calibrated while the other is being used for monitoring.

Figure 13:
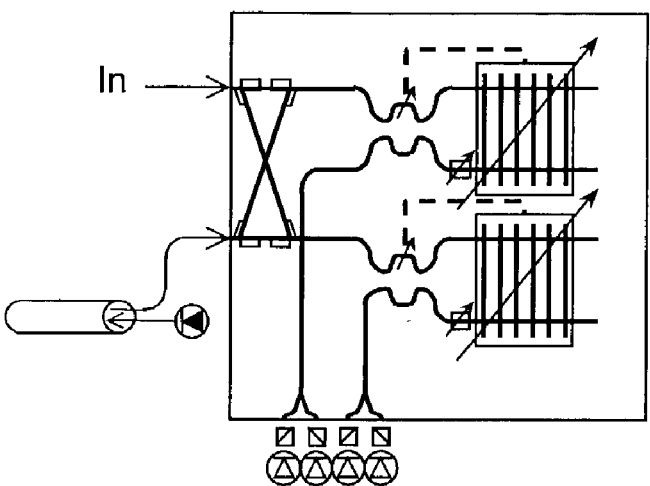
FIG. 13 describes a monitor similar to FIG. 11 except that two MZI's cover two segments of the wavelength tuner.
14.
Figure 14:
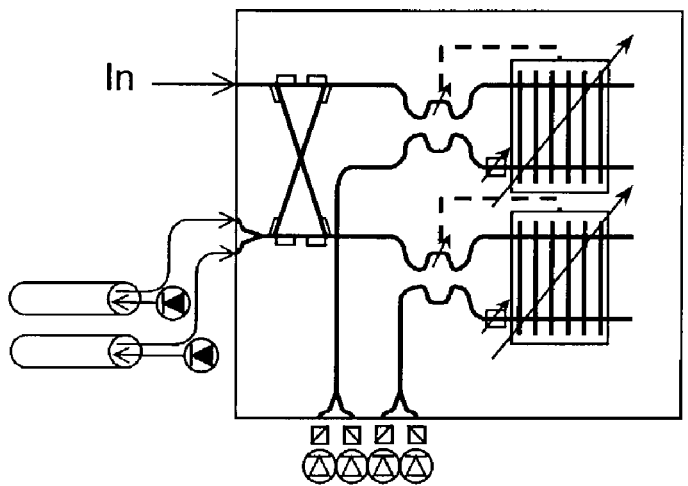
FIG. 14 describes a monitor similar to FIG. 13 where two references are used.
15.

FIG. 14:

Similar to FIG. 13, except two references are used (typically one at each end of the tuning wavelength range) to provide two points on the calibration curve for higher accuracy.

FIG. 15:

Similar to FIG. 11, except a transmissive absolute wavelength reference (e.g., a Fabry-Perot etalon) is used. If this reference is an etalon, it provides a continuous comb of reference peaks, allowing to very accurately calibrate the tuning curve across the tuning range.

Figure 15:
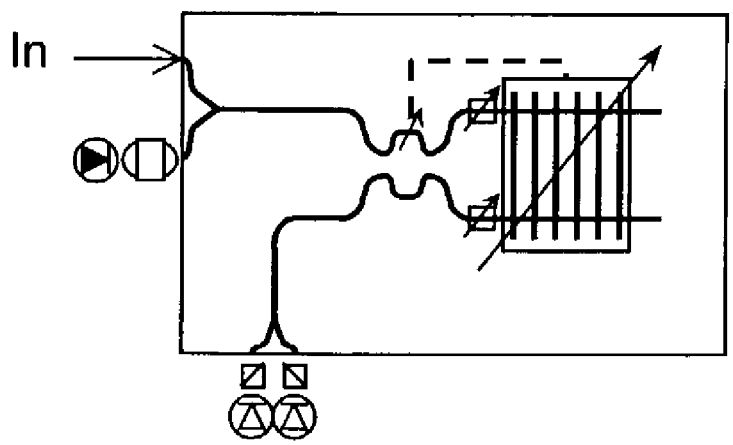
FIG. 15 describes a monitor similar to FIG. 11 where a transmissive wavelength reference is used.
16.
Figure 16:
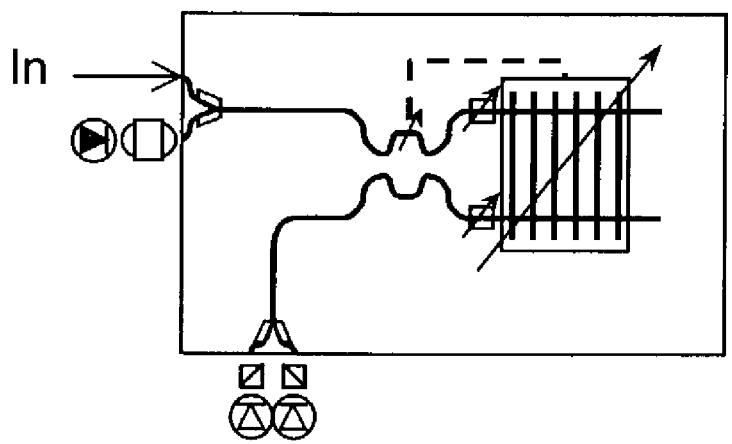
FIG. 16 describes a monitor similar to FIG. 15 where 1×2 switches are used instead of 1×2 combiners.
17.

FIG. 16: Similar to FIG. 15, except 1×2 switches are used instead of 1×2 combiners. Said 1×2 switches can be fully switched, allowing lower optical transmission loss through the device, thus enabling higher dynamic range. Said 1×2 switches can also be used for active 50/50 balancing.

FIG. 17:

Example of non-identical TE and TM tuning curves (wavelength vs. temperature) for a thermally tunable notch filter.

In all the above designs, the input, output, and references, can be at any chip facet, and the chip shape can be other than rectangular.

What is claimed is:

1. An apparatus comprising an input, a separation means for separating an optical signal directed to the input into two polarization eigenmodes; two optical power detectors, each disposed to receive only one said polarization eigenmode; one or more tunable optical wavelength notch filters disposed between the input and at least one of the optical power detectors; and wherein the separation means comprises a 3 dB power splitter or a 1×2 optical switch, and two polarizers, each said polarizer being disposed to receive an optical signal filtered through the tunable optical wavelength notch filter, and each said polarizer being disposed immediately proximate to one of the optical power detectors, each said polarizer being disposed to transmit to said detector only one said eigenmode.

* * * * *